D. ELLIOTT.
JEWELRY CATCH.
APPLICATION FILED JAN. 16, 1914.
Reissued May 26, 1914. 13,741.
*Fig. 1,*
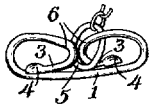
*Fig. 2,*
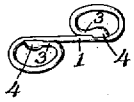
*Fig. 3,*
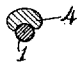
WITNESSES
John O. Tempeler
Karl Monington
David Elliott INVENTOR
BY Kenyon & Kenyon ATTORNEYS
COLUMBIA PLANOGRAPH CO., WASHINGTON, D. C.

UNITED STATES PATENT OFFICE.

DAVID ELLIOTT, OF JOHNSTOWN, PENNSYLVANIA.

JEWELRY-CATCH.

13,741. Specification of Reissued Letters Patent. Reissued May 26, 1914.

Original No. 1,070,431, dated August 19, 1913, Serial No. 703,611. Application for reissue filed January 16, 1914. Serial No. 812,610.

*To all whom it may concern:*

Be it known that I, DAVID ELLIOTT, a citizen of the United States, and a resident of Johnstown, in the county of Cambria and State of Pennsylvania, (whose post-office address is care of Penn Traffic Co., same place), have invented certain new and useful Improvements in Jewelry-Catches, of which the following is a specification.

My invention relates to improvements in jewelry catches, and more particularly to catches for necklaces and other flexible forms of jewelry.

One of the objects of my invention is to provide a simple, durable and easily made jewelry catch and one by means of which a connection ring may be readily secured and disengaged and from which the connecting ring cannot be released by tension on the chain, and which will effectively prevent the ring from becoming accidentally released in any position which it may assume and which will have no projecting ends or extensions to catch in lace work or other wearing apparel.

My invention will be more readily understood and further objects and advantages of the invention will more fully appear from the following description taken in connection with the accompanying drawings in which—

Figure 1 shows a form of the invention with a connection ring about to be released therefrom; Fig. 2 shows a modification; and Fig. 3 shows in cross-section a novel form of knob used on the catch.

Referring to the drawings, Fig. 1 shows a catch, preferably made of resilient metal, having loops, one at each end of an intermediate or stem portion 1. The loops are formed by bending each end of the metal back upon itself and then down into engagement with the stem portion 1 so that the extremity or end portion 3 of each loop rests upon the intermediate portion and presses resiliently upon it so that the center line of the entire piece will be in a single plane. The extremities of the looped portions 3, where they engage the intermediate portion, are provided with suitably shaped knobs 4 to prevent the end of the loop from catching in wearing apparel and to facilitate in operating the catch. The side of each knob resting upon the intermediate portion 1 of the catch is preferably slightly concaved so as to assist in holding the inner end of the loop from being bent out laterally. The inner curved portions 6 of the loops are brought close to and preferably into engagement with each other so that the connection ring, on being released, as well as on being engaged in the catch, must be forced down between these two adjacent inner portions of the loops and then outwardly toward the outer end of the loop in which the ring is to be secured or from which it is to be released.

The manner of engaging and disengaging a connecting ring from the catch above described, is as follows: The ring 5 to be secured in the catch is first forced down between the curved portions 6 and is then held at the inner end of the loop in a plane normal to the stem 1, and is then forced toward the outer end of one of the loops, whereupon the lower side of the ring is forced between the portion 3 of the loops and the bottom or stem portion 1. After the ring is secured in the catch, any tension on the chain tends to hold the ring in its proper position in the outer end of the loop, and if the ring is thrown back to the other end of the loop it is caught in that end and prevented from becoming disengaged. In order to release the ring from the catch, it is necessary to force one side out between the portions 6, and then to move the ring toward the inner end of the loop and then turn it down until the side of the ring outside of the loop rests against the stem portion 1, and then draw the ring forward in the same direction in which it was drawn to catch it in the loop, so that this outer side of the ring will be forced under the engaging parts of the loop, whereupon the ring is disengaged. It will thus be seen that, to release the ring from the catch, it is necessary to turn it back over the inner end of the loop, force it between the portions 6, and then draw it forward in the same direction in which it was drawn to engage it and in the direction of the normal tension on the chain. The portion 3 of the loop need not necessarily rest in engagement with the stem portion 1, so long as the knob 4 is pressing against this part of the catch; but in the preferred form of my invention, this portion does press down upon the intermediate portion 1 to insure strong pressure between these two parts.

In the form of catch shown in Fig. 2, one of the loops is formed on the opposite side of the intermediate or stem portion 1 from the other.

It will thus be seen that I have provided a durable and efficient catch which may be bent up from a piece of suitable metal, such as spring metal, and which has no projecting parts to become caught in wearing apparel, and which has no pivoted or sliding spring-operated parts which are liable to become broken or disarranged, and one which is pleasing in appearance.

Having thus described my invention, what I claim as new and desire to secure by Letters Patent, is:

1. A jewelry catch made from a single piece of metal, said catch having an intermediate portion the ends of which are looped back and then down upon and into engagement with the intermediate portion and pointed out again toward the ends of said intermediate portion, the center line of the entire piece when complete lying in a single plane so as to present no ends projecting beyond the loops or laterally thereof, whereby an engaging catch ring to be released from one of the loops is moved back over the inner end of the loop and then turned down and forced outward between the engaging parts of the loop and intermediate portion.

2. A jewelry catch made from a single piece of metal, said catch having an intermediate portion the ends of which are looped back along and then down into engagement with the intermediate portion and then pointed out again along the intermediate portion, the center line of the entire piece of metal when complete lying in one plane, the ends of the looped portions being provided with knobs resting upon the lower side of the loop so as to form a catch without protruding ends.

3. A jewelry catch formed of a single piece of resilient metal, said catch having an intermediate portion the ends of which are looped back along and then down upon and into resilient engagement with the intermediate portion and out again along said portion, the center line of the entire piece of metal lying in one plane, the inner ends of the loops being closely adjacent each other and the looped ends being provided with knobs whereby, to release a catch ring from a loop, it must be forced between the adjacent inner ends of the loops and then out between the engaging portions of the loop in which it is caught.

4. A jewelry catch made of a single piece of resilient metal and having an intermediate portion the ends of which are looped back along and then down upon and into engagement with the intermediate portion and pointed out again, the center line of the entire piece when complete lying in a single plane, the inner ends of the loops being resiliently held in engagement with each other and the extremities of the looped portions being provided with knobs having recessed parts straddling the lower side of the loops to hold the ends in the plane of the loops.

In testimony whereof, I have signed my name to this specification, in the presence of two subscribing witnesses.

DAVID ELLIOTT.

Witnesses:
RICHARD EYER,
EDWIN SEGER.

Copies of this patent may be obtained for five cents each, by addressing the "Commissioner of Patents, Washington, D. C."